US012708063B2

(12) United States Patent
Smith, Jr. et al.

(10) Patent No.: US 12,708,063 B2
(45) Date of Patent: Aug. 18, 2026

(54) WORK TOOL ASSEMBLY FOR MACHINE SYSTEM AND METHOD OF OPERATING SAME

(71) Applicant: Caterpillar Inc., Peoria, IL (US)

(72) Inventors: Terry M. Smith, Jr., Clayton, NC (US); Mathew C. Frana, Bell Buckle, TN (US); Steven J. Juricak, New Hill, NC (US)

(73) Assignee: Caterpillar Inc., Peoria, IL (US)

( * ) Notice: Subject to any disclaimer, the term of this patent is extended or adjusted under 35 U.S.C. 154(b) by 323 days.

(21) Appl. No.: 18/498,476

(22) Filed: Oct. 31, 2023

(65) Prior Publication Data

US 2025/0133976 A1 May 1, 2025

(51) Int. Cl.

*A01B 63/02* (2006.01)
*A01B 15/02* (2006.01)
*E02F 3/96* (2006.01)
*E02F 9/08* (2006.01)

(52) U.S. Cl.

CPC ............ *A01B 63/02* (2013.01); *A01B 15/025* (2013.01); *E02F 3/961* (2013.01); *E02F 9/0891* (2013.01)

(58) Field of Classification Search

CPC ... E02F 5/32; E02F 9/003; E02F 3/961; E02F 9/0891; E02F 3/3414; A01B 63/02; A01B 15/025

See application file for complete search history.

(56) References Cited

U.S. PATENT DOCUMENTS 3,738,432 A * 6/1973 Kelley ...................... E02F 5/32 37/367
4,060,261 A 11/1977 Bauer et al.
4,081,035 A * 3/1978 Bowen ...................... E02F 5/32 172/699
4,313,504 A * 2/1982 Fischer ..................... E02F 5/32 172/473
5,711,391 A 1/1998 Brandt et al.
6,764,270 B1 7/2004 Deere
8,573,336 B2 11/2013 Arulraja et al.
2015/0152623 A1* 6/2015 Yamazaki ................. E02F 5/32 172/663
2020/0056344 A1 2/2020 Bobcat
2024/0417949 A1* 12/2024 Vahling ................. E02F 3/8157

FOREIGN PATENT DOCUMENTS

WO 2016100958 A1 6/2016
WO WO-2020101007 A1 * 5/2020 ............. G06V 20/56

* cited by examiner

*Primary Examiner* — Theodore N Yao

(57) ABSTRACT

A machine system includes a machine having a work tool assembly coupled to a back machine end and including a linkage adjustable among raised, lowered, and middle linkage positions in a vertical operating range. A work tool coupled to the linkage has an angular orientation dependent upon the position of the linkage and is pivotable at a greater pivoting ratio to the raised linkage position and a reduced pivoting ratio to the lowered linkage position. The configuration enables maintaining the work tool at a desired service orientation in a ground-penetrating portion of the vertical operating range, whilst tucking the work tool at the raised linkage position to facilitate loading of the machine onto a trailer.

17 Claims, 4 Drawing Sheets

26
40
64
66
56
58
28
44
68
50
48
52
34
33
54

33
30
44
56
58
46
30
28
32
30
47
40
60
62
26
42
38

26
40
74
44
30
30
46
38
72
42

106
100
26
30
50
60
62

106
26
30
50
60
62

106
26
30
50
60
62
102
104

WORK TOOL ASSEMBLY FOR MACHINE SYSTEM AND METHOD OF OPERATING SAME

TECHNICAL FIELD

The present disclosure relates generally to linkage kinematics in a machine, and relates more particularly to configuring a linkage for optimum positioning of a work tool in a portion of a linkage operating range.

BACKGROUND

Off-highway machines equipped with a wide range of different tools and attachments (collectively "work tools") are well-known throughout the world and used in applications ranging from construction to mining, forestry, road building, and agriculture. In recent years engineers have developed a variety of new and improved work tool types as well as coupling and decoupling strategies in a continued effort to diversify the efficiency and range of applications for any one machine.

Many operators wish to use off-highway machines for different jobs, each best performed using different specialized work tools. Different bucket types, blades, augers, and scarifiers are available as original equipment or as aftermarket products. Research and development and commercial offerings of such work tools have been particularly successful in the case of certain smaller machines such as skid steer loaders.

Skid steer loaders employing wheels or tracks are used in a variety of operations to move, dig, load, level, contour, and otherwise manipulate substrate material. Since such machines are often trailered from worksite to worksite and may transition among different purposes even at the same worksite, providing work tools that can be readily attached, detached, and stowed on-board can be highly desirable but challenging from an engineering perspective. Moreover, the design and properties of such machines, including weight distribution as well as other factors, can sometimes make transportation unwieldly or inconvenient where work tool attachments are involved. One example skid steer loader is set forth in U.S. Pat. No. 8,573,336 B2 to Arulraja et al.

SUMMARY

In one aspect, a machine system includes a machine having a front machine end, a back machine end, and a plurality of ground-engaging propulsion elements. The machine system further includes a work tool assembly coupled to the back machine end and including a linkage projecting rearwardly of the machine, a work tool, and a hinge joint coupling the work tool to the linkage and defining an axis. The linkage is adjustable among a plurality of linkage positions in a vertical operating range including a raised linkage position, a lowered linkage position, and a middle linkage position. The work tool has an angular orientation about the axis that is dependent upon the position of the linkage in the vertical operating range, and is pivotable about the axis from a tucked orientation at the raised linkage position, to a service orientation at each of the middle linkage position and the lowered linkage position. The work tool is pivotable about the axis at a greater pivoting ratio between the raised linkage position and the middle linkage position, and at a reduced pivoting ratio between the middle linkage position and the lowered linkage position.

In another aspect, a work tool assembly includes a left vertically extending mount, a right vertically extending mount, and a linkage having a left link assembly coupled to the left vertically extending mount and including a left hinge joint, a right link assembly coupled to the right vertically extending amount and including a right hinge joint, and a carrier coupled to the left hinge joint and the right hinge joint. The work tool assembly further includes a work tool coupled to the carrier. The linkage is adjustable among a plurality of linkage positions in a vertical operating range including a raised linkage position, a lowered linkage position, and a middle linkage position. The left hinge joint and the right hinge join define an axis, and the work tool has an angular orientation about the axis that is dependent upon the position of the linkage in the vertical operating range. The work tool is pivotable about the axis from a tucked orientation at the raised linkage position, to a service orientation at each of the middle linkage position and the lowered linkage position.

In still another aspect, a method of operating a work tool assembly includes adjusting a linkage in a work tool assembly in a vertical operating range between a lowered linkage position and a raised linkage position. The method further includes pivoting a work tool having an angular orientation that is dependent upon the position of the linkage in the vertical operating range at a reduced pivoting ratio in a ground-penetrating lower portion of the vertical operating range ending at the lowered linkage position, and maintaining the work tool at a service orientation in the ground-penetrating lower portion of the vertical operating range. The method still further includes pivoting the work tool at a greater pivoting ratio in an upper portion of the vertical operating range ending at the raised linkage position, and positioning the work tool at a tucked orientation when the linkage is at the raised linkage position.

DETAILED DESCRIPTION

Figure 1:
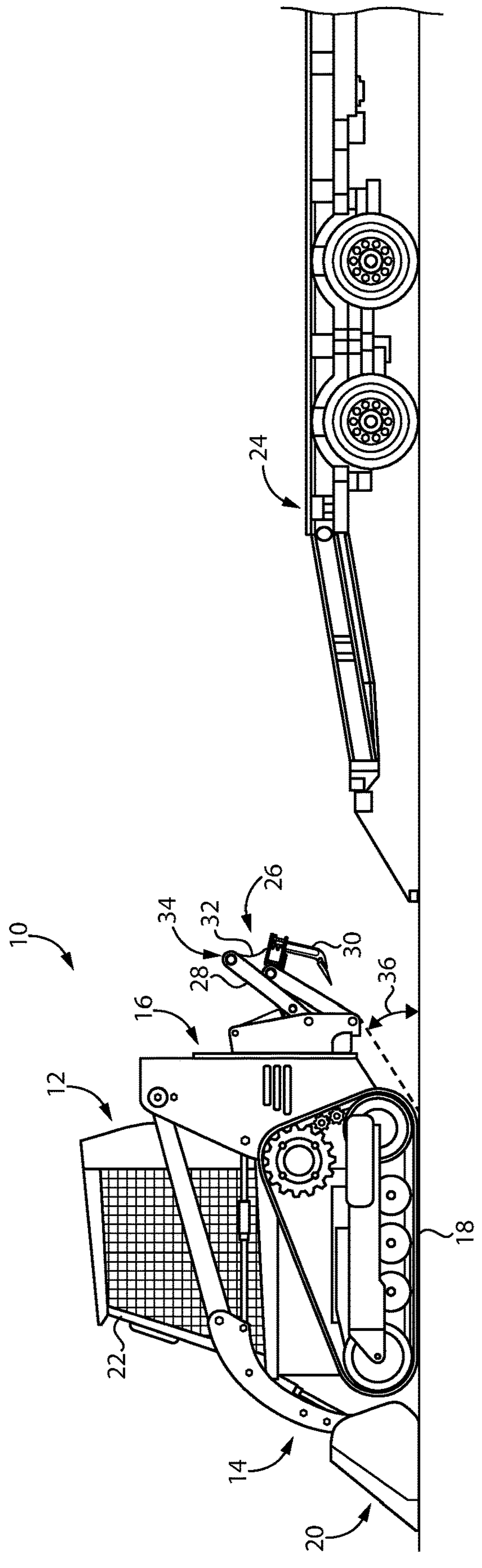
FIG. 1 is a side diagrammatic view of a machine system in proximity to a trailer for transport, according to one embodiment.

Referring to FIG. 1, there is shown a machine system 10 according to one embodiment, and including a machine 12 having a front machine end 14, a back machine end 16, and a plurality of ground-engaging propulsion elements 18 arranged between front machine end 14 and back machine end 16. Machine 12 also includes a front implement system 20, illustrated as a hydraulically actuated bucket implement system, and an operator cab 22. Machine 12 is shown in the context of a skid steer loader where ground-engaging propulsion elements 18 include tracks. Other machine types and configurations, including ground-engaging wheels instead of tracks, are within the scope of the present disclosure. Machine 12 is also shown in proximity to a trailer 24 for transporting machine 12. Certain machine types including skid steer loaders are commonly backed onto a trailer in a reverse direction due at least in part to weight distribution of the machine tending to be heaver to the back end thereof.

In the illustrated embodiment, machine system 10 includes a work tool assembly 26 coupled to back machine end 16. Work tool assembly 26 includes a linkage 28 projecting rearwardly of machine 12, a work tool 30, and a hinge joint 32 coupling work tool 30 to linkage 28. Linkage 28 may be adjustable among a plurality of linkage positions in a vertical operating range, including a raised linkage position, a lowered linkage position, and a plurality of middle linkage positions vertically between the raised linkage position and the lowered linkage position. The plurality of linkage positions may also include a parallel linkage position as further discussed herein.

As depicted in FIG. 1 linkage 28 is at the raised linkage position, positioning work tool assembly 26 out of the way of parts of trailer 24 such as a loading ramp, to reduce likelihood of collision between work tool assembly 26 and trailer 24 as machine 12 is reverse loaded thereon. In particular, a departure angle 36 may be defined between a horizontal plane of an underlying substrate, and machine system 10. Also in certain instances departure angle 36 may be from approximately 20° to approximately 40°, although the present disclosure is not thereby limited. At the raised linkage position linkage 28 and work tool 30 may be positioned vertically above rays of departure angle 36, such that backing machine 12 onto trailer 24 in the ordinary course does not cause collision between work tool assembly 26 and trailer 24, as further discussed herein.

Figures 2, 3, 4:
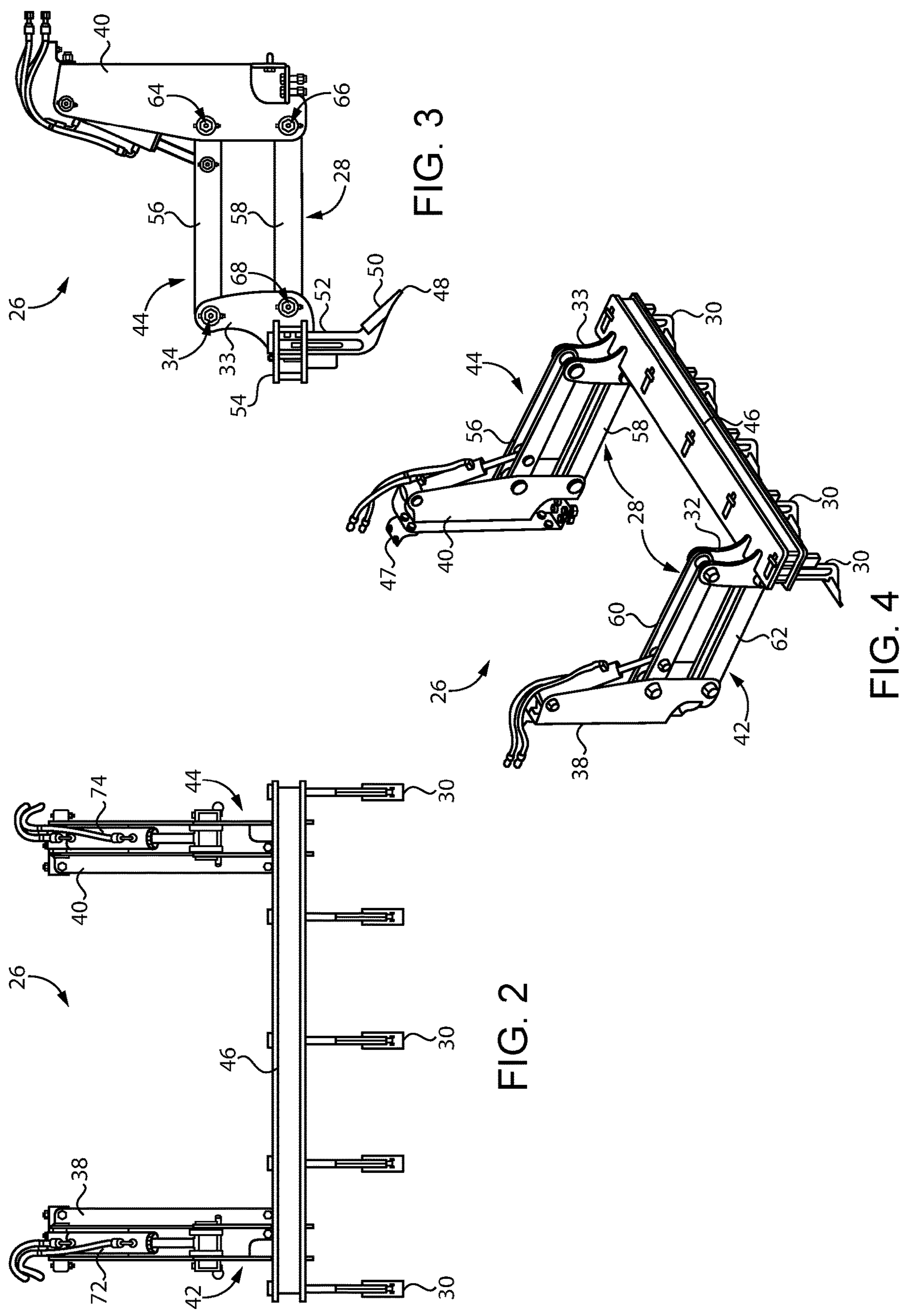
FIG. 2 is a rear view of a work tool assembly, according to one embodiment.
FIG. 3 is a side diagrammatic view of the work tool assembly as in FIG. 2.
FIG. 4 is a pictorial view of the work tool assembly as in FIG. 2.

Referring also now to FIGS. 2-4, hinge joint 32 may define an axis 34 horizontally extending as shown in FIG. 1. Work tool 30 may have an angular orientation about axis 34 that is dependent upon the position of linkage 28 in the vertical operating range. In the present context, "dependent upon" can be understood to mean defined by, meaning that work tool 30 is not independently pivotable, and an angular orientation of work tool 30 does not vary except by vertically raising or lowering linkage 28. Work tool 30 is pivotable, based on adjustment of linkage 28, about axis 34 from a tucked orientation at the raised linkage position, to a service orientation at each of the middle linkage position and the lowered linkage position. Work tool 30 may be pivotable about axis 34 at a greater pivoting ratio between the raised linkage position and the middle linkage position, and at a reduced pivoting ratio between the middle linkage position and the lowered linkage position. The described functionality can be understood to mean that work tool 30 pivots to a greater relative extent about axis 34 as linkage 28 is approaching the raised linkage position and to a lesser relative extent about axis 34 as linkage 34 approaches the lowered linkage position. Put differently, based on the design of linkage 28 rotation of work tool 30 relative to a vertical position of linkage 28 is greater in the upper portion of the vertical operating range of linkage 28, and less in the lower portion of the vertical operating range of linkage 28. As a result, work tool 30 is maintained within a relatively narrow range of orientations each suitable for service while vertically adjusted in the lower portion of the vertical operating range. The lower portion may include a ground-penetrating lower portion of the vertical operating range.

Work tool assembly 26 may further include a left vertically extending mount 38 and a right vertically extending mount 40. Linkage 28 may include a left link assembly 32 coupled to right vertically extending mount 38 and including hinge joint 32 (a "left" hinge joint). Linkage 28 may also include a right link assembly 44 coupled to right vertically extending mount 40 and including a right hinge joint 33. Linkage 28 may also include a subframe or carrier 46 coupled to left hinge joint 32 and right hinge joint 33 so as to extend horizontally between left link assembly 42 and right link assembly 44. Work tool 30 may be coupled to carrier 36, and in the illustrated embodiment includes one of a plurality of interchangeable work tools 30 spaced horizontally along carrier 46. Each work tool 30, hereinafter referred to at times in the singular, may be one of a plurality of interchangeable scarifiers or scarifier tips.

As can also be seen from the drawings, each of left link assembly 42 and right link assembly 44 may include an upper link 56, 60 and a lower link 58, 62 connected via the respective left hinge joint 32 and right hinge joint 33. Each respective upper link 56, 60 and lower link 58, 62 may be pivotable in the vertical operating range about an upper link axis 64 and a lower link axis 66, respectively. Each upper link 56, 60 and lower link 58, 62 may include two parallel link plates (not numbered) in some embodiments. Each of left vertically extending mount 38 and right vertically extending mount 40 may each include two parallel mounting plates (not numbered). FIG. 4 also illustrates a bolting plate 47 attached to right vertically extending mount 40 and structured for bolting work tool assembly 26 onto machine 12 in one embodiment. Additional bolting plates may be provided upon left vertically extending mount 38 or to other parts of work tool assembly 26 or machine 12. Rather than bolting work tool assembly 26 onto machine 12 work tool assembly 26 might be welded, for example.

FIG. 3 also illustrates another axis 68. Hinge joint 33 may rotate relative to upper link 56 and relative to lower link 58 about axes 34 and 68, respectively. Either of axes 34 or 68 could be understood as a reference axis about which work tool 30 has an angular orientation dependent upon the position of linkage 28 in the vertical operating range as described herein. It can also be noted that in FIG. 3 upper link 56 and lower link 58 are oriented substantially parallel to one another in the illustrated view, and that lower link 58 and upper link 56 have unequal link lengths. Lower link 58 is shorter in the illustrated embodiment. In other embodiments upper link 56 might be shorter than lower link 58. Work tool assembly 26 also includes a first hydraulic actuator 74 coupled between right vertically extending mount 40 and right link assembly 44, and a second hydraulic actuator 72 coupled between left vertically extending mount 38 and left link assembly 42. At least one actuator coupled to linkage 28 is contemplated herein, and movable between a retracted position at the raised linkage position and a bottomed-out extended position at the lowered linkage position.

FIG. 3 also illustrates work tool 30 having a ground-penetrating terminal tip 48, and a tool surface 50 that extends to tip 48. A shank or shaft 52 extends vertically upward and is supported in a tip mount 54 coupled to carrier 46. In an implementation work tool 30 is removably mounted in mount 54, and may be reversibly mounted in mount 54. Other work tools such as a blade, for example, are contemplated within the scope of the present disclosure.

Figures 5, 6, 7:
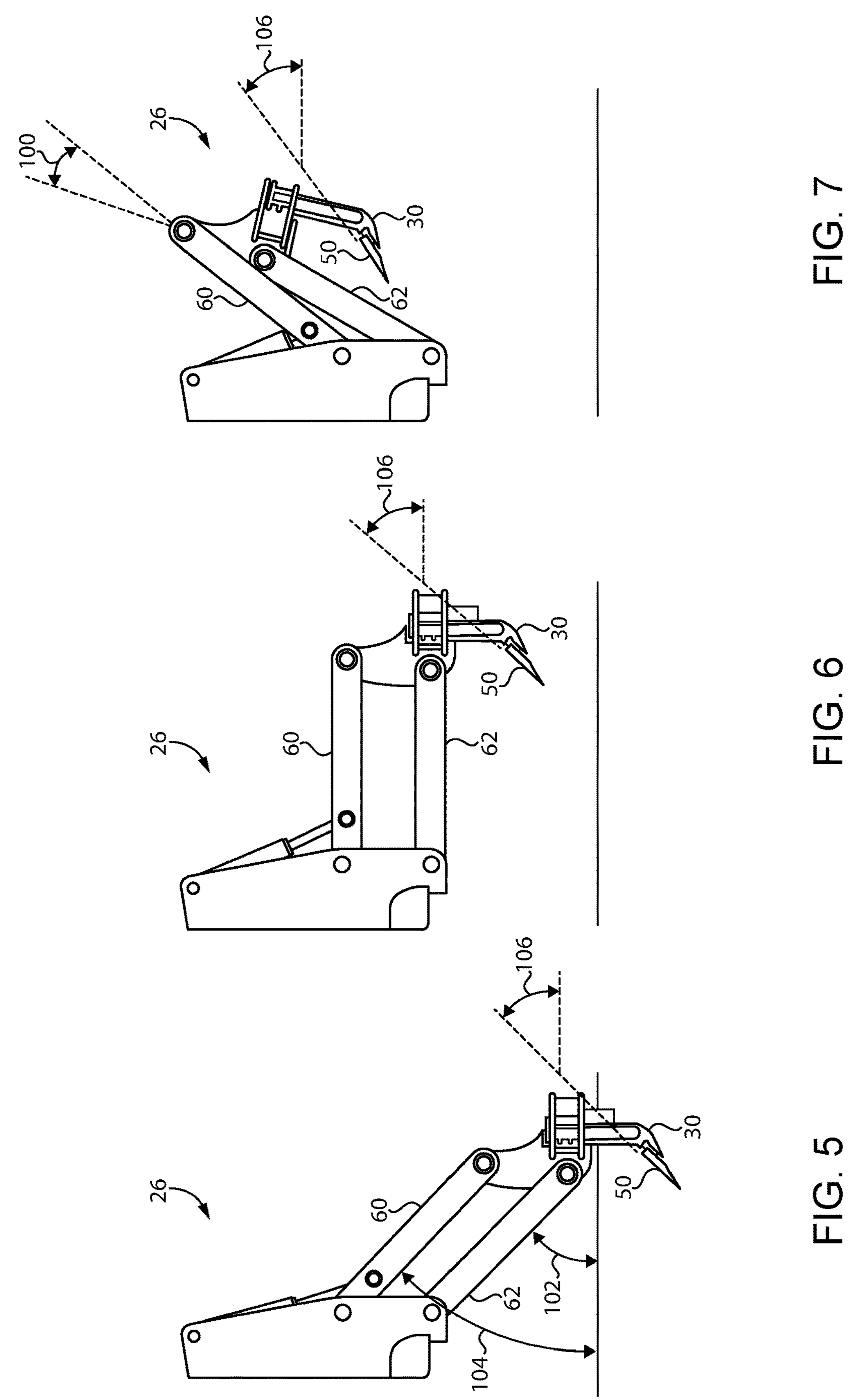
FIG. 5 is a side diagrammatic view of a work tool assembly including a linkage at a lowered linkage position.
FIG. 6 is a side diagrammatic view of a work tool assembly as in FIG. 5 with the linkage at a middle linkage position.
FIG. 7 is a side diagrammatic view of a work tool as in FIG. 5 with the linkage at a raised linkage position.

Referring also now to FIG. 5, it will be recalled that work tool 30 is maintained at a service orientation between a middle linkage position and a lowered linkage position. The subject middle linkage position may or may not be a parallel linkage position. Maintaining of work tool 30 at a service orientation does not mean that work tool 30 does not change orientation, but instead that work tool 30 changes orientation only so much as is tolerable for work tool 30 to operate as desired at a range of relative digging depths interacting with substrate material. In the context of a scarifier as shown it can generally be desirable for the scarifier to be maintained within a relatively narrow range of angles as it cuts into and engages with material of a substrate. To this end, tool surface 50 is oriented diagonally. An angle 106 is defined between tool surface 50 and a horizontal plane, and may vary 2° or less between the middle linkage position approximately as shown in FIG. 6, and the lowered linkage position approximately as shown in FIG. 5. In an embodiment, angle 106 might vary 1° or less between the respective linkage positions, and in one practical implementation varies approximately 0.2°. Thus, raising or lowering linkage 28 between the lowered linkage position and the middle linkage position may vary angle 106 only 0.2°. Adjusting linkage 28 between the middle linkage position and the raised linkage position, however, may vary angle 106 to a greater relative extent. In one practical implementation, at the lowered linkage position angle 106 might be 50.5°, at the middle linkage position angle 106 might be 50.7°, and at the raised linkage position angle 106 might be 39.6°. Accordingly, a "service orientation" as contemplated herein might include a predefined orientation plus or minus 2°, plus or minus 1°, plus or minus 0.2°, or still another range.

Also shown in FIGS. 5-7 are certain angular relationships between upper link 60 and lower link 62. It will be understood by way of analogy that similar angular relationships can be observed in the link assembly not shown in FIG. 5-7. In the illustrated embodiment, upper link 60 and lower link 62 together define a larger acute angle 100 at the raised linkage position as shown in FIG. 7. Upper link 60 and lower link 62 may together define a smaller acute angle at the lowered linkage position. A first angle 102 is shown in FIG. 5 between lower link 62 and a horizontal plane, and a second angle 104 is shown defined between upper link 60 and the horizontal plane. It can be appreciated that a difference between angle 102 and angle 104 may correspond to the smaller acute angle defined between upper link 60 and lower link 62 at the lowered linkage position. In an embodiment, the larger acute angle 100 might be approximately 9.5°, and the smaller acute angle may be less than 1°.

Figure 8:
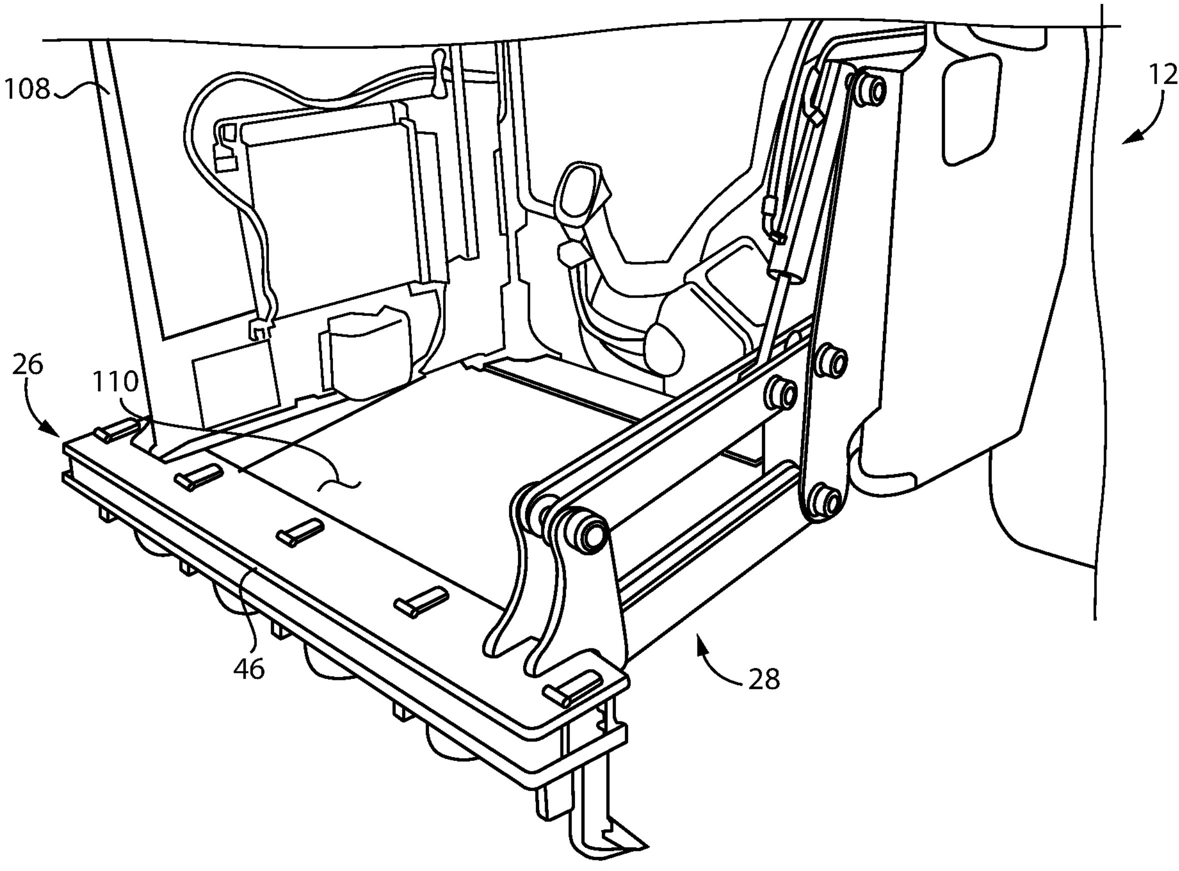
FIG. 8 is a diagrammatic view of a machine system with a rear axis door opened within a spatial envelope defined by a work tool assembly, according to one embodiment.

Turning now also to FIG. 8, there is shown a rear access door 108 of machine 12 as might be used to access internal systems including an engine, fluid systems, cooling systems, and others. Rear access door 108 is movable between a closed position, and a full open position approximately as shown, within a spatial envelope 110 defined together by right link assembly 44, left link assembly 42, and carrier 46. Such an arrangement can enable an operator or technician to readily access internal systems in machine 12 without interference by work tool assembly 26.

INDUSTRIAL APPLICABILITY

Referring to the drawings generally, it will be recalled that linkage 28 in work tool assembly 26 is adjustable in the vertical operating range between the lowered linkage position and the raised linkage position. During the adjustment of linkage 28, work tool 30 may pivot at a reduced pivoting ratio in a ground-penetrating lower portion of the vertical operating range ending at the lowered linkage position. For this reason only minimal variation in an orientation of work tool 30 will occur even while adjusted vertically to vary a depth at which work tool 30 interacts with substrate material.

With reference to FIGS. 5-7 specifically, raising or lowering linkage 28 may result in work tool 30 pivoting at the reduced pivoting ratio to transition between the configurations shown in FIGS. 5 and 6. Transitioning between the configurations shown in FIGS. 6 and 7, however, can result in pivoting work tool 30 at a greater pivoting ratio in the upper portion of the vertical operating range ending at the raised linkage position. This capability assists in efficiently positioning work tool 30 at a tucked orientation out of the way for trailer loading or other purposes when linkage 28 is at the raised linkage position. With linkage 28 raised and work tool 30 tucked, machine 12 can be backed onto trailer 24 as depicted in FIG. 1 avoiding any likelihood of collision between work tool assembly 26 and trailer 24. Work tool assembly 26 and parts thereof can be sold as original equipment installed on machine 12, or as an aftermarket system to be added on by an end user or owner.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A machine system comprising:

a machine including a front machine end, a back machine end, and a plurality of ground-engaging propulsion elements;

a work tool assembly coupled to the back machine end and including a linkage projecting rearwardly of the machine, a work tool, and a hinge joint coupling the work tool to the linkage and defining an axis;

the linkage is adjustable among a plurality of linkage positions in a vertical operating range including a raised linkage position, a lowered linkage position, and a middle linkage position;

the work tool having an angular orientation about the axis that is dependent upon the position of the linkage in the vertical operating range, and being pivotable about the axis from a tucked orientation at the raised linkage position, to a service orientation at each of the middle linkage position and the lowered linkage position;

a first angle is defined between the work tool and a horizontal plane;

the work tool is pivotable about the axis at a greater pivoting ratio between the raised linkage position and the middle linkage position, such that the angle is varied in size to a greater relative extent between the raised linkage position and the middle linkage position, and at a reduced pivoting ratio between the middle linkage position and the lowered linkage position, such that the first angle is varied in size to a lesser relative extent between the middle linkage position and the lowered linkage position;

the linkage includes an upper link and a lower link pivotable in the vertical operating range about an upper link axis and a lower link axis, respectively, having fixed locations relative to the machine;

the upper link and the lower link are connected via the hinge joint; and the upper link and the lower link together define a larger acute angle at the raised linkage position, and a smaller acute angle at the lowered linkage position, and wherein the smaller acute angle is less than 5°.

2. The machine system of claim 1 wherein the upper link and the lower link are connected via the hinge joint and have unequal link lengths.

3. The machine system of claim 1 wherein one of the plurality of linkage positions includes a parallel linkage position, and wherein the work tool includes a tool surface extending to a terminal tip, and the first angle is defined between the tool surface and the horizontal plane and varies 2° or less between the parallel linkage position and the lowered linkage position.

4. The machine system of claim 1 wherein a departure angle is defined between the machine system and the horizontal plane, and at the raised linkage position the linkage and the work tool are vertically above rays of the departure angle.

5. The machine system of claim 1 wherein the linkage includes a left link assembly and a right link assembly, and a carrier spaced rearwardly of the back machine end and connecting the left link assembly to the right link assembly, and the work tool is mounted to the carrier.

6. The machine system of claim 5 wherein the machine includes a rear access door movable between a closed position and a full open position within a spatial envelope defined together by the right link assembly, the left link assembly, and the carrier when the linkage is at the middle linkage position.

7. The machine system of claim 5 wherein the work tool is one of a plurality of interchangeable scarifier tips spaced horizontally along the carrier.

8. A work tool assembly comprising:

a left vertically extending mount;

a right vertically extending mount;

a linkage including a left link assembly coupled to the left vertically extending mount and including a left hinge joint, a right link assembly coupled to the right vertically extending mount and including a right hinge joint, and a carrier coupled to the left hinge joint and the right hinge joint;

a work tool coupled to the carrier;

the linkage is adjustable among a plurality of linkage positions in a vertical operating range including a raised linkage position, a lowered linkage position, and a middle linkage position;

the left hinge joint and the right hinge joint define an axis, and the work tool having an angular orientation about the axis that is dependent upon the position of the linkage in the vertical operating range, and being pivotable about the axis from a tucked orientation at the raised linkage position, to a service orientation at each of the middle linkage position and the lowered linkage position;

a first angle is defined between the work tool and a horizontal plane, and the first angle has a larger size in the service orientation and a smaller size in the tucked orientation;

each of the left link assembly and the right link assembly includes an upper link and a lower link connected via the respective left hinge joint and right hinge joint, and the upper link and the lower link in each of the left link assembly and the right link assembly being pivotable in the vertical operating range about an upper link axis and a lower link axis, respectively; and the upper link and the lower link in each of the right link assembly and the left link assembly together define a larger acute angle at the raised linkage position, and a smaller acute angle at the lowered linkage position, and wherein the smaller acute angle is less than 5°.

9. The work tool assembly of claim 8 wherein the work tool includes a ground-penetrating tip.

10. The work tool assembly of claim 9 wherein the work tool is one of a plurality of interchangeable scarifier tips spaced horizontally along the carrier.

11. The work tool assembly of claim 8 wherein the work tool is pivotable at a greater pivoting ratio between the raised linkage position and the middle linkage position, and at a reduced pivoting ratio between the middle linkage position and the lowered linkage position.

12. The work tool assembly of claim 8 wherein the upper link and the lower link in each of the left link assembly and the right link assembly have unequal link lengths.

13. The work tool assembly of claim 8 further comprising at least one actuator coupled to the linkage and movable between a retracted position at the raised linkage position to a bottomed-out extended position at the lowered linkage position.

14. A method of operating a work tool assembly comprising:

adjusting a linkage in a work tool assembly in a vertical operating range between a lowered linkage position and a raised linkage position;

pivoting a work tool having an angular orientation that is dependent upon the position of the linkage in the vertical operating range at a reduced pivoting ratio in a ground-penetrating lower portion of the vertical operating range ending at the lowered linkage position;

maintaining the work tool at a service orientation in the ground-penetrating lower portion of the vertical operating range;

pivoting the work tool at a greater pivoting ratio in an upper portion of the vertical operating range ending at the raised linkage position; and positioning the work tool at a tucked orientation when the linkage is at the raised position;

wherein an angle defined between the work tool and a horizontal plane is varied to a lesser relative extent based on the reduced pivoting ratio, and the angle is varied to a greater relative extent based on the greater pivoting ratio;

the linkage is positionable at a parallel linkage position between the lowered linkage position and the raised linkage position, and the angle varies 2° or less between the parallel linkage position and the lowered linkage position.

15. The method of claim 14 further comprising backing a machine supporting the work tool assembly on a back end thereof onto a trailer with the work tool at the tucked orientation.

16. The method of claim 14 wherein the work tool includes a scarifier.

17. A machine system comprising:

a machine including a front machine end, a back machine end, and a plurality of ground-engaging propulsion elements;

a work tool assembly coupled to the back machine end and including a linkage projecting rearwardly of the machine, a work tool, and a hinge joint coupling the work tool to the linkage and defining an axis;

the linkage is adjustable among a plurality of linkage positions in a vertical operating range including a raised linkage position, a lowered linkage position, and a middle linkage position;

the work tool having an angular orientation about the axis that is dependent upon the position of the linkage in the vertical operating range, and being pivotable about the axis from a tucked orientation at the raised linkage position, to a service orientation at each of the middle linkage position and the lowered linkage position;

the work tool is pivotable about the axis at a greater pivoting ratio between the raised linkage position and the middle linkage position, and at a reduced pivoting ratio between the middle linkage position and the lowered linkage position; and one of the plurality of linkage positions includes a parallel linkage position, and wherein the work tool includes a tool surface extending to a terminal tip, and an angle defined between the tool surface and a horizontal plane varies 2° or less between the parallel linkage position and the lowered linkage position.

* * * * *